(12) United States Patent
Haines et al.

(10) Patent No.: US 6,808,255 B1
(45) Date of Patent: Oct. 26, 2004

(54) STORAGE OF PRINTING DEVICE USAGE DATA ON A PRINTING DEVICE REPLACEABLE COMPONENT

(75) Inventors: Robert E. Haines, Boise, ID (US); Quintin T. Phillips, Boise, ID (US); Darius Boockholdt, Eagle, ID (US); Joseph L. Burquist, Boise, ID (US); Mark A. Harper, Middleton, ID (US); Santiago Rodriguez, Boise, ID (US); K. Trent Christensen, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/479,958

(22) Filed: Jan. 10, 2000

Related U.S. Application Data

(63) Continuation-in-part of application No. 09/410,989, filed on Oct. 1, 1999.

(51) Int. Cl.[7] .................. B41J 2/175; G03G 15/00
(52) U.S. Cl. .............................. 347/86; 399/12
(58) Field of Search ................... 347/32, 7, 5, 19, 347/86; 400/174; 340/568.1; 399/12, 24, 25, 26, 27, 81

(56) References Cited

U.S. PATENT DOCUMENTS

| | | | |
|---|---|---|---|
| 4,857,893 A | * | 8/1989 | Carroll |
| 5,049,898 A | * | 9/1991 | Arthur et al. |
| 5,528,222 A | * | 6/1996 | Moskowitz et al. |
| 5,610,635 A | * | 3/1997 | Murray et al. |
| 5,682,140 A | * | 10/1997 | Christensen et al. |
| 5,838,253 A | * | 11/1998 | Wurz et al. ............ 340/825.54 |
| 5,930,553 A | * | 7/1999 | Hirst et al. ..................... 399/8 |
| 6,039,430 A | * | 3/2000 | Helterline et al. |

FOREIGN PATENT DOCUMENTS

WO   WO 98/52762   * 11/1998

OTHER PUBLICATIONS

"RFID: Everything You Need To Know", Motorola, Inc., (19 pages), Nov. 11, 1997.*

"MicroStamp 4000–1 Interrogator, Technical Information," Micron Communications, Inc., (13 pages), Sep. 1, 1998.*

Hook, Chris, "The Application of RFID Tags as Anti-Counterfeiting Devices," Texas Instruments, http://www.ti.com/mc/docs/tiris/docs/hook.htm.*

* cited by examiner

Primary Examiner—Huan Tran

(57) ABSTRACT

A printing system utilizes memory integrated into a replaceable component to store printing device usage data. The manufacturer of the printing device retrieves the data when the component is returned to the manufacturer for recycling.

15 Claims, 3 Drawing Sheets

STORAGE OF PRINTING DEVICE USAGE DATA ON A PRINTING DEVICE REPLACEABLE COMPONENT

CROSS REFERENCE TO RELATED APPLICATIONS

This application is a continuation in part of co-pending U.S. application Ser. No. 09/410,989 filed Oct. 1, 1999.

TECHNICAL FIELD

This invention generally relates to replaceable printing device components, and more particularly, to replaceable printing device components having a memory.

BACKGROUND

Several types of printing devices, such as printers, copiers, facsimile machines, etc., have replaceable components installed in them that have a life cycle during which the component is functional. When the functional life cycle ends, the component is replaced with a new component. Examples of replaceable components for printing devices include ink cartridges, toner cartridges, ribbon cartridges, fusers, photoconductors, drums, and the like.

After a replaceable component has reached the end of its functional life cycle, it can be recycled. Recycling a component involves the user returning a depleted component to the manufacturer at the end of the component's life cycle. Then, the manufacturer can dispose of the component safely. In addition, there may be parts from the depleted component that the manufacturer may salvage for use in new components and thereby reduce the amount of waste. Toner cartridges can also be refurbished by the original manufacturer or by another toner cartridge vendor so that the toner cartridge may be re-used.

Cartridges can be manufactured with cartridge memory integrated therein or incorporated into a cartridge label. This memory is used to store printer related data that the printer reads to determine certain printing parameters and communicate information to the user. For example, the memory may store the model number of the cartridge so that the printer may recognize the cartridge as one which is compatible with that particular printer. Additionally, by way of example, the cartridge memory may store the number of pages that can be expected to be printed from the cartridge during a life cycle, thereby allowing the printer to determine how many additional pages may be printed by the cartridge.

This advancement in technology can be used together with the recycling process to provide a printer component manufacturer an opportunity to gather direct feedback from customers about how the component has been used.

Such information is very valuable to printer component manufacturers because it helps them to understand the conditions under which their products are used. This information can then be used in designing and manufacturing new printing devices to operate more efficiently under such conditions.

Currently, printer manufacturers rely on methods such as customer surveys to gather the information. However, customer surveys, if presented to the customer in written form, are only completed and returned by a small percentage of customers. The printer manufacturer cannot rely on such a small sampling as being completely accurate with regard to all, or almost all, printer users.

Customer surveys can be undertaken by personally interviewing customers as to the conditions under which their printers operate. Besides being cost prohibitive in most circumstances, the customer may not know certain information—such as temperature and humidity extremes—under which their printer operates.

SUMMARY

A printing system utilizes memory integrated into a replaceable component to store printing device usage information. The manufacturer or remanufacturer retrieves the information when the component is returned for recycling. The information is used to optimize printers and printer components for use in such conditions.

During operation of the printer, the printer can be configured to record certain usage information in the memory of the component. The information can include the length of print jobs performed by the printer. The explicit length of each print job can be recorded, or the printer may be configured to simply keep a record of how many short, medium and long print jobs are performed utilizing the component, relative to a certain page count for each length of print job.

The printer may also be equipped with temperature and humidity sensors which monitor environmental conditions during operation of the printer. Temperature and humidity extremes measured during printer operation can be recorded in the component memory.

A printer manufacturer may also wish to know what brands of replaceable components are used in the printer. The printer or the cartridge may be configured to detect the name brand of each replaceable component used in the printer and record this information in the component memory. The printer manufacturer can use this information to address marketing deficiencies which may be discovered upon analysis of the information.

The above enumeration is not meant to limit the type of information that may be recorded in the component memory. Other such information may include a job complexity rating for each print job, the time that is required to print each print job, or any other similar usage date.

When the component is returned to the manufacturer for recycling, the usage information is read from the component memory before the component is recycled. The data obtained from the component may be utilized in design, manufacture and marketing of subsequent printers manufactured and/or sold by the manufacturer.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
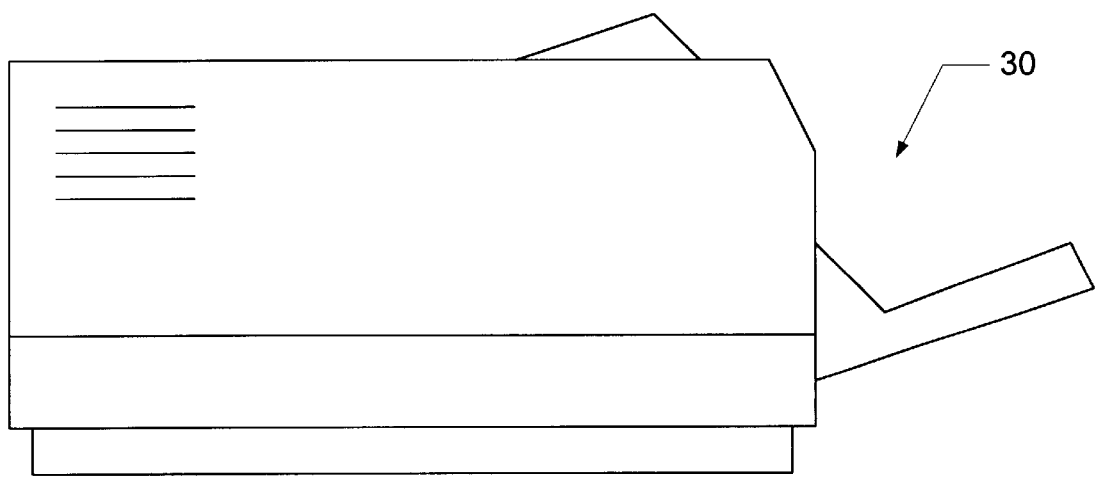
FIG. 1 is a diagrammatic illustration of a laser printer.

FIG. 1 is a diagrammatic illustration of a laser printer 30 in which the present invention may be implemented. The invention may further be implemented in other units that employ printing devices, such as scanners, photocopiers, facsimile machines, and the like. For purposes of discussion, the invention is described in the context of laser printers.

Figure 2:
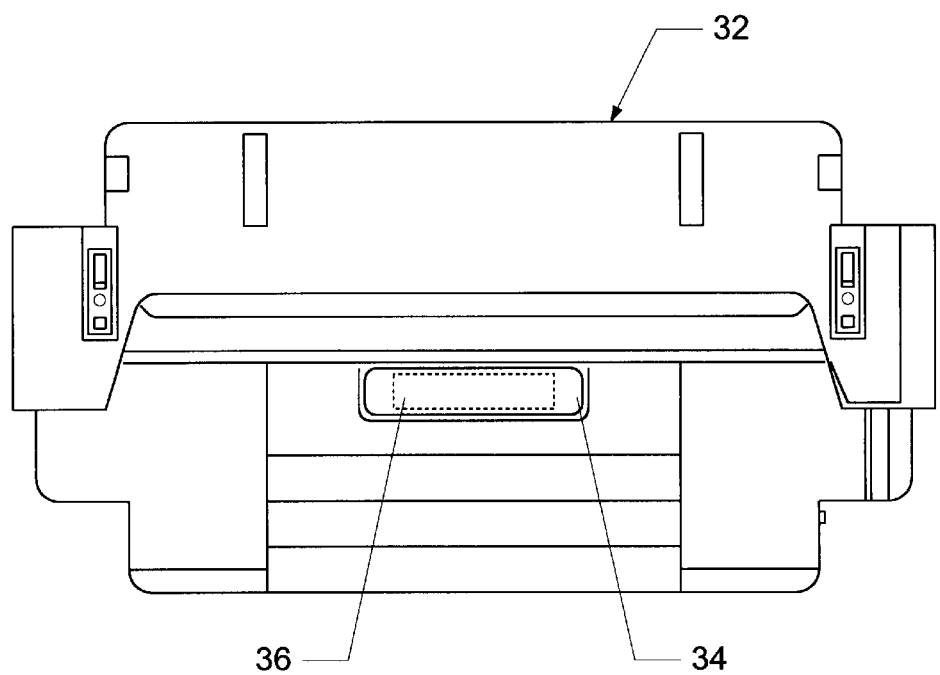
FIG. 2 is a diagrammatic illustration of a laser printer toner cartridge.

FIG. 2 shows a toner cartridge 32 which is installable in the laser printer 30. The toner cartridge 32 has a label 34 which contains information identifying the toner cartridge 32 to a user. The label 34 typically recites the name of the manufacturer, the model number of the cartridge, etc. Although the invention is shown and described herein embodied as a printer toner cartridge for a laser printer, it is noted that the invention may be embodied as any replaceable component (toner cartridge, ink cartridge, fuser, drum, etc.) installable in a printing device (printer, copier, fax machine, etc.).

A memory tag 36 is located underneath the label 34 on the toner cartridge 32, although it is understood that the memory tag 36 may be placed on the toner cartridge 32 at any location which may be practical for the purposes described herein. The memory tag 34 is preferably a radio frequency identification (RFID) memory tag. RFID memory tags and applications there for are well known in the art. Further aspects of the RFID memory tag 36 structure and its functionality in the present invention will become more clear as the discussion progresses.

Figure 3:
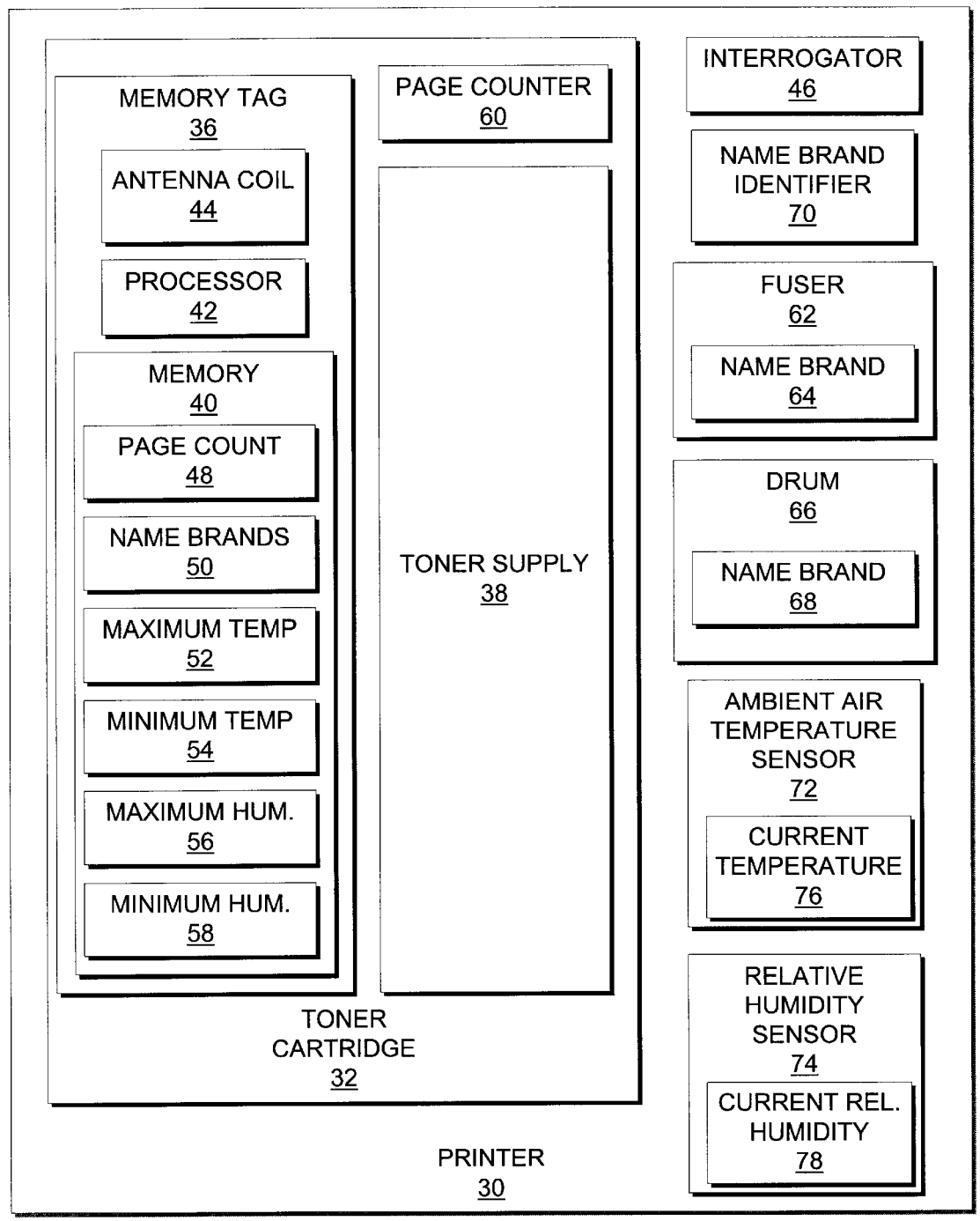
FIG. 3 is a block diagram of a printer.

FIG. 3 shows the printer 30 having a toner cartridge 32 installed therein. The cartridge is replaceable and thus may be removed and replaced by another toner cartridge (not shown). The toner cartridge 32 includes the memory tag 36 and a toner supply 38.

As previously stated, the memory tag 36 is an RFID memory tag, although it is noted that the memory tag 36 may comprise other types of memory known in the art, such as conventional semiconductor memory, a magnetic strip, etc.

The RFID memory tag 36 has memory 40, a processor 42, and an antenna coil 44. The RFID memory tag 36 is designed to operate in conjunction with an interrogating device, also known as an interrogator. An interrogator is a device that reads from or writes to the memory tag 36. Examples of interrogators include a memory tag reader or scanner, a memory tag writing device which stores data on the memory tag 36, and the like. In the present example, the laser printer 30 includes an interrogator 46.

The interrogating device emits a radio frequency field which provides power to the memory tag 36 via the antenna coil 44. The memory tag 36, therefore, does not require its own power supply, a feature which adds to the cost efficiency and practicality of utilizing RFID memory for the memory tag 36.

Communications between an interrogator and an RFID memory tag are transmitted and received via the radio frequency field and the antenna coil 44 utilizing standard RFID method and protocol, as promulgated in ISO 14443 and ISO 15693. Therefore, physical contact between the memory tag 36 and the printer 30 is not required for the printer 30 to communicate with the memory tag 36.

The memory 40 has several printer usage data parameters stored therein. These printer usage data parameters include page count 48, name brands 50, maximum temperature 52, minimum temperature 54, maximum humidity 56 and minimum humidity 58.

Page count 48 stores the length of print jobs performed by the printer. The toner cartridge 32 includes a page counter 60 to count the number of pages printed from the toner cartridge 32. It is noted that, although the page counter is shown as a part of the toner cartridge 32, the page counter 60 may be located within the printer 30. The explicit length of each print job can be recorded, or the printer may be configured to simply keep a record of how many short, medium and long print jobs are performed utilizing the component, relative to a certain page count for each length of print job. For example, a short print job may be a print job that prints less than five pages, a medium print job may be a print job that prints from five to ten pages, and a long print job may be a print job that prints more than ten pages.

Name brands 50 stores the name of the manufacturer that produces other replaceable components that are present in the printer 30. The printer 30 includes a fuser 62 having a name brand 64, and a drum 66 having a name brand 68. The printer 30 also has a name brand identifier 70 which is configured to identify other replaceable components, such as the fuser 62 and the drum 66, and record the name brands 64, 68 of each in the name brands 50 of the memory 40.

The printer 30 also includes an ambient air temperature sensor 72 and a relative humidity sensor 74, which monitor the temperature and relative humidity, respectively, of the air around the printer 30 when the printer 30 is in operation. The ambient air temperature sensor 72 stores a current temperature 76 and the relative humidity sensor 74 stores a current relative humidity 78.

It is noted that although the functional components of the printing system 40 are shown in specific locations, the functional components may be located on the printer 30, the toner cartridge 32, the computer 66, or the vendor system 74 provided the functionality of the printing system 40 is preserved.

Figure 4:
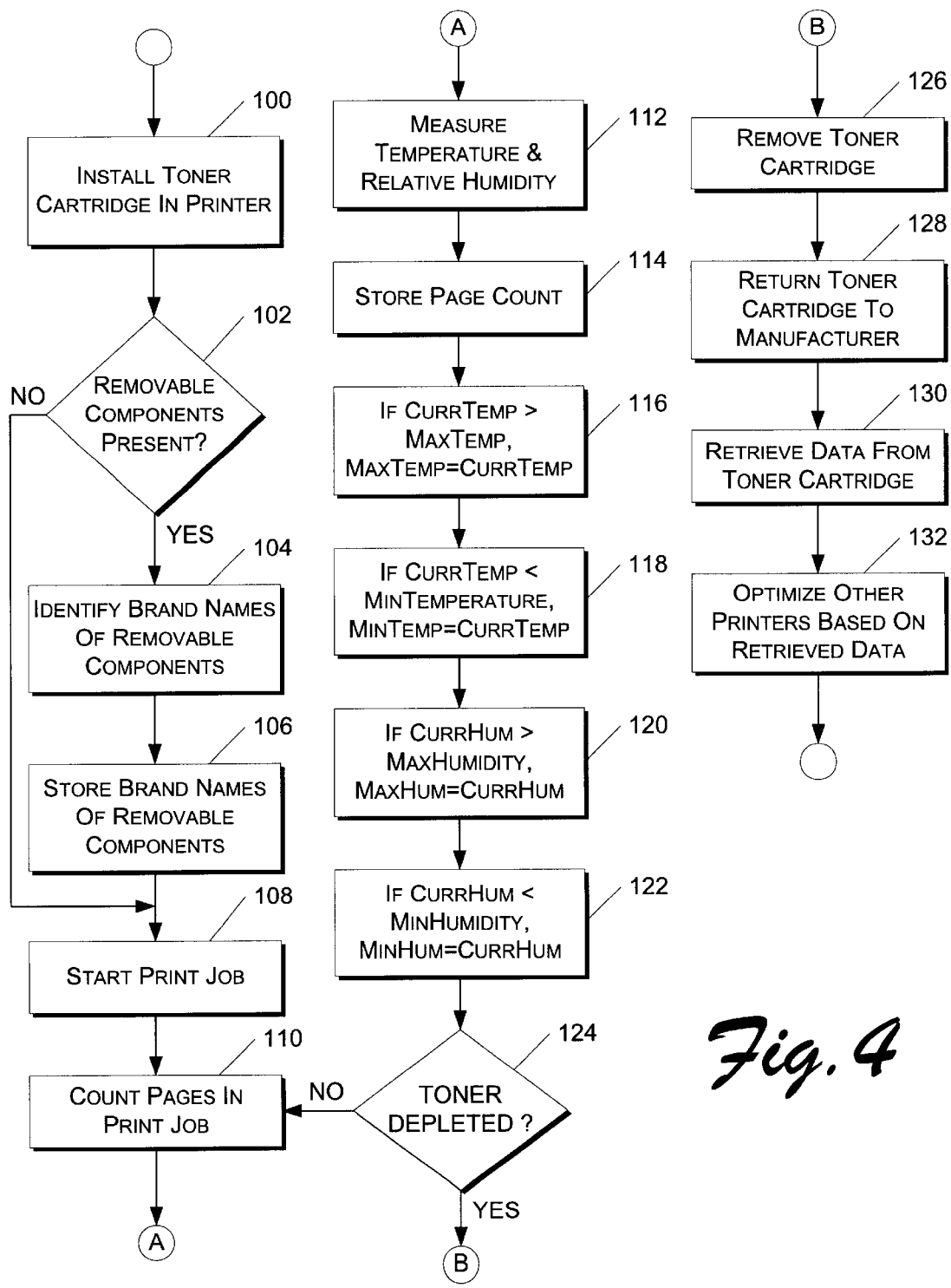
FIG. 4 is a flow diagram of a process to record and retrieve printer usage data from a replaceable printing device component.

FIG. 4 depicts a process to record and retrieve printer usage data from a replaceable printing device. The process begins at step 100 when the user installs the toner cartridge 32 into the printer 30. At step 102, the name brand identifier 70 polls the printer 30 to determine if there are any other removable components in the printer 30. If there are other removable components in the printer 30 ("YES" branch, step 102), the name brand identifier 70 identifies the brand name of each removable component (step 104). The name brands 50 of the other removable components (fuser, 62; drum, 66) are then stored in the memory 40.

After the name brands 50 have been identified and stored in memory 40, the printing process using the toner cartridge 32 begins at step 108. As a print job is executed utilizing the toner cartridge 32, the page counter 60 determines how many pages are in the print job (step 110). During the print job, at step 112, the ambient air temperature sensor 72 measures the air temperature around the printer 30 and retains the measurement as the current temperature 76. Simultaneously, the relative humidity sensor 74 measures the relative humidity of the air around the printer 30 and retains the measurement as the current relative humidity 78.

At step 114, the page count 48 is stored in memory 40. Step 116 shows that the current temperature 76 is recorded as the maximum temperature 52 when the current temperature 76 exceeds the maximum temperature 52 stored in the memory 40. If, at step 118, the current temperature 72 is less than the minimum temperature 54, the current temperature 76 is recorded as the minimum temperature 54.

At step 120, the current relative humidity 78 is recorded as the maximum relative humidity 56 when the current relative humidity 78 exceeds the maximum relative humidity 56 stored in the memory 40. If the current relative humidity 78 is less than the minimum relative humidity 58 stored in the memory 40, the current relative humidity 56 is recorded as the minimum relative humidity 58 (step 122).

If the toner supply 38 is not depleted, more print jobs are executed from step 108 ("NO" branch, step 118). At step 126, the user removes the toner cartridge 32 from the printer 30 when the toner supply 38 is depleted. The user returns the toner cartridge 32 to the toner cartridge manufacturer at step 128. The toner cartridge manufacturer retrieves the data stored in the toner cartridge 32 (step 130) and uses the data to optimize other printers based on the retrieved data (step 124).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention. It is also noted that the method may be performed by a human or by a machine, or by a combination of both.

What is claimed is:

1. In a printing device having a replaceable component with component memory integrated therein, a method comprising:

identifying name brand information about at least one other replaceable component installed in the printing device; and storing the name brand information in the component memory.

2. The method recited in claim 1 wherein the component memory is radio frequency identification (RFID) memory, and wherein the storing is accomplished without requiring physical contact between the printing device and the component memory.

3. The method recited in claim 1 wherein the identifying and storing occurs each time the other replaceable component is replaced.

4. The method recited in claim 1 wherein the name brand information is identified and stored periodically during specified time periods at predetermined intervals.

5. A printing device comprising:

a first replaceable component installable therein and removable therefrom, the first replaceable component having component memory integrated therein;

a second replaceable component having a name brand;

a name brand identifier configured to identify the name brand of the second replaceable component; and a storing device configured to store the name brand of the second replaceable component in the component memory of the first replaceable component.

6. The printing device recited in claim 5 wherein:

the component memory is radio frequency identification (RFID) memory;

the printing device further comprises an RFID interrogator configured to store the name brand of the second replaceable component in the component memory.

7. The printing device recited in claim 5 wherein the name brand of the second replaceable component is stored in the component memory a second time when the second replaceable component is replaced.

8. The printing device recited in claim 5 wherein the name brand of the second replaceable component is stored multiple times at a specified time intervals.

9. The printing device recited in claim 5 wherein the printing device is a laser printer.

10. A toner cartridge installable in and removable from a laser printer, the toner cartridge comprising memory that stores name brand information about one or more replaceable components in the laser printer received from a name brand identifier located in the laser printer.

11. The toner cartridge recited in claim 10 wherein the memory further comprises radio frequency identification (RFID) memory.

12. A replaceable printing device component installable in and removable from a printing device, the component comprising memory that stores name brand information about one or more replaceable components in the printing device, the name brand information received from a name brand identifier located in the printing device.

13. The replaceable printing device component recited in claim 12 wherein the name brand information about a particular replaceable component can be stored more than once in the component memory.

14. The replaceable printing device component recited in claim 12 wherein the component memory is radio frequency identification (RFID) memory.

15. The replaceable printing device component recited in claim 12 wherein the printing device component comprises a toner cartridge for a laser printer.

* * * * *